United States Patent
Hawley et al.

(10) Patent No.: US 12,115,964 B1
(45) Date of Patent: Oct. 15, 2024

(54) GEAR SELECTION FOR MERGING INTO FASTER TRAFFIC

(71) Applicant: Toyota Motor Engineering & Manufacturing North America, Inc., Plano, TX (US)

(72) Inventors: Thomas S. Hawley, Ann Arbor, MI (US); Bradley S. Nowlin, Howell, MI (US); Syed S. Ali, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 0 days.

(21) Appl. No.: 18/226,714

(22) Filed: Jul. 26, 2023

(51) Int. Cl.
| | |
|---|---|
| *B60W 10/10* | (2012.01) |
| *B60Q 1/34* | (2006.01) |
| *B60R 1/12* | (2006.01) |
| *B60W 30/18* | (2012.01) |
| *B60W 30/08* | (2012.01) |

(52) U.S. Cl.
CPC ............. B60W 10/10 (2013.01); B60Q 1/343 (2013.01); B60R 1/1207 (2013.01); B60W 30/18163 (2013.01); B60W 30/08 (2013.01); B60W 2540/18 (2013.01); B60W 2554/4041 (2020.02); B60W 2554/4045 (2020.02); B60W 2554/80 (2020.02); B60W 2554/804 (2020.02); B60W 2710/1005 (2013.01)

(58) Field of Classification Search
CPC ........... B60W 10/10; B60W 30/18163; B60W 30/08; B60W 2540/18; B60W 2554/4041; B60W 2554/80; B60W 2710/1005; B60W 2554/804; B60W 2554/4045; B60R 1/1207
USPC ......................................... 701/54, 64, 65, 66
See application file for complete search history.

(56) References Cited

U.S. PATENT DOCUMENTS

| | | | |
|---|---|---|---|
| 5,959,572 | A | 9/1999 | Higashimata et al. |
| 6,185,499 | B1 | 2/2001 | Kinoshita et al. |
| 6,598,494 | B1 | 7/2003 | Giefer |
| 7,447,583 | B2 | 11/2008 | Ogawa |
| 8,514,101 | B2 | 8/2013 | Mathieu et al. |

(Continued)

FOREIGN PATENT DOCUMENTS

| | | |
|---|---|---|
| DE | 102012216422 A1 | 3/2014 |
| JP | 2019001283 A | 1/2019 |

*Primary Examiner* — Roger L Pang
(74) *Attorney, Agent, or Firm* — Snell & Wilmer LLP

(57) ABSTRACT

Methods, systems, and apparatus for a lane assist system that prepares the vehicle to move from a current lane to an adjacent lane. The lane assist system includes a sensor for detecting a vehicle in an adjacent lane and an electronic control unit connected to the sensor. The electronic control unit is configured to determine that the vehicle intends to move from a current lane to the adjacent lane and, in response, controls operations of an automatic transmission of the vehicle to prepare the vehicle for a lane change based on a calculated time duration for the adjacent vehicle to reach the vehicle. The electronic control unit can be further configured to command one or more indicators to be displayed at an indicator display located at a side-view mirror of the vehicle based on the determination and the calculated time duration for the adjacent vehicle to reach the vehicle.

17 Claims, 11 Drawing Sheets

(56) References Cited

U.S. PATENT DOCUMENTS

| | | |
|---|---|---|
| 9,327,722 B1 | 5/2016 | Johri et al. |
| 9,682,708 B2* | 6/2017 | Maruyama ............ B60W 10/04 |
| 10,365,655 B2 | 7/2019 | Im et al. |
| 10,710,588 B2* | 7/2020 | Geller ............. B60W 30/18163 |
| 10,737,698 B2 | 8/2020 | Tatourian et al. |
| 11,104,340 B2 | 8/2021 | Naserian et al. |
| 11,305,776 B2 | 4/2022 | Beiderbeck et al. |
| 11,420,631 B2 | 8/2022 | Tsuji et al. |
| 2017/0088053 A1* | 3/2017 | Orellana ................... B60R 1/00 |
| 2018/0251129 A1* | 9/2018 | Ji .................... B60W 30/18163 |
| 2021/0291868 A1* | 9/2021 | Okuda .............. B60W 60/0015 |
| 2021/0343148 A1* | 11/2021 | Lee ........................ H04W 4/38 |
| 2023/0415734 A1* | 12/2023 | Zhu ....................... G01S 13/931 |

\* cited by examiner

GEAR SELECTION FOR MERGING INTO FASTER TRAFFIC

BACKGROUND

1. Field

This specification relates generally to systems and methods for lane change control for a vehicle.

2. Description of the Related Art

Many accidents occur when a vehicle changes, moves, or merges into another lane. When a vehicle is in a lane with slower moving traffic, the driver may merge to an adjacent lane with faster moving traffic. The driver can cause the vehicle to accelerate by pushing on an accelerator pedal, which can then cause the vehicle to shift to a lower gear to facilitate the acceleration depending on a position of the accelerator pedal. This downshift takes time and results in a lag or hesitation between the time the driver pushes on the accelerator pedal and the time the vehicle downshifts to accelerate to the desired speed.

Accordingly, there is a need for a system and method for predicting and preparing the vehicle to merge or move from a current lane into an adjacent lane while minimizing vehicle response time.

SUMMARY

In general, one aspect of the subject matter described in this specification is embodied in a lane assist system for a vehicle. The lane assist system includes an automatic transmission, a sensor for detecting an adjacent vehicle in an adjacent lane, and an electronic control unit connected to the sensor. The electronic control unit is configured to determine that the vehicle intends to move from a current lane to the adjacent lane, determine a time duration for the adjacent vehicle in the adjacent lane to reach the vehicle, and control operation of the automatic transmission to prepare the vehicle for a lane change based upon the determination that the vehicle intends to move from the current lane to the adjacent lane and the time duration.

These and other embodiments may optionally include one or more of the following features. The electronic control unit can be configured to determine that the vehicle intends to move from the current lane to the adjacent lane in response to detecting that a turn signal has been activated.

The electronic control unit can be further configured to determine a first time margin for a current gear of the automatic transmission based upon the time duration. The controlling operation of the automatic transmission can include maintaining the current gear of the automatic transmission in response to the first time margin being greater than a first threshold time. The electronic control unit can be further configured to command a first indicator be displayed at an indicator display on a side-view mirror of the vehicle in response to the first time margin being greater than the first threshold time. The indicator display can include a light source.

The electronic control unit can be further configured to determine a second time margin for a gear below the current gear of the automatic transmission based upon the time duration. The controlling operation of the automatic transmission can include down-shifting the automatic transmission one gear in response to the second time margin being greater than a second threshold time. The electronic control unit can be further configured to command a second indicator be displayed at the indicator display on the side-view mirror of the vehicle in response to the second time margin being greater than the second threshold time. The controlling operation of the automatic transmission can include down-shifting the automatic transmission one gear in response to both the second time margin being greater than the second threshold time and an engine speed of the vehicle being less than an engine speed limit.

The electronic control unit can be further configured to determine a third time margin for a gear below the current gear of the automatic transmission based upon the time duration. The controlling operation of the automatic transmission can include down-shifting the automatic transmission in response to the third time margin being greater than a third threshold time. The electronic control unit can be further configured to command a third indicator be displayed at the indicator display on the side-view mirror of the vehicle in response to the third time margin being greater than the third threshold time. The controlling operation of the automatic transmission can include down-shifting the automatic transmission in response to both the third time margin being greater than the third threshold time and a steering angle of a steering wheel of the vehicle greater than a threshold angle.

The lane assist system can further include a battery for storing electrical energy, a battery management unit for managing charging and discharging of the electrical energy of the battery to power movement of the vehicle, and a motor that uses the electrical energy to power movement of the vehicle.

To calculate the time duration for the adjacent vehicle in the adjacent lane to reach the vehicle, the electronic control unit can be configured to calculate a distance between the vehicle and the adjacent vehicle in the adjacent lane, calculate a speed difference between a speed of the adjacent vehicle and a speed of the vehicle, and calculate a quotient of the distance between the vehicle and the adjacent vehicle divided by the speed difference between the speed of the adjacent vehicle and the speed of the vehicle, the quotient being the time duration.

The lane assist system can further include a user interface element for receiving driver input that indicates that a driver intends to merge the vehicle into the adjacent lane. The electronic control unit can be configured to obtain, from the user interface element, the driver input that indicates that the driver intends to merge into the adjacent lane.

In another aspect, the subject matter is embodied in a method for controlling operation of a vehicle to assist in lane changing. The method includes obtaining, from at least one of a sensor or an external database, a position of an adjacent vehicle in an adjacent lane. The method includes calculating, by an electronic control unit, a time duration for the adjacent vehicle to reach a position of the vehicle. The method includes determining, by the electronic control unit, that the vehicle intends to move from a current lane to the adjacent lane. The method includes controlling, by the electronic control unit, an operation of an automatic transmission of the vehicle to prepare for a lane change of the vehicle based on the time duration and the determination that the vehicle intends to move from the current lane to the adjacent lane.

These and other embodiments may optionally include one or more of the following features. Calculating the time duration for the adjacent vehicle to reach the position of the vehicle can include calculating a distance between the vehicle and the adjacent vehicle in the adjacent lane, calculating a speed difference between a speed of the adjacent vehicle and a speed of the vehicle, and calculating a quotient of the distance between the vehicle and the adjacent vehicle divided by the speed difference between the speed of the adjacent vehicle and the speed of the vehicle, the quotient being the time duration. Controlling the operation of the automatic transmission of the vehicle to prepare for the lane change can include at least one of maintaining a current gear of the automatic transmission or down-shifting the transmission. The method can further include sending, by the electronic control unit, an indicator be displayed at an indicator display on a side-view mirror of the vehicle based upon the time duration.

In another aspect, the subject matter is embodied in a method for controlling operation of a vehicle to assist in lane changing. The method includes obtaining, from at least one of a sensor or an external database, a position of an adjacent vehicle in an adjacent lane. The method includes calculating, by an electronic control unit, a time duration for the adjacent vehicle to reach a position of the vehicle. The method includes determining, by the electronic control unit, that the vehicle intends to move from a current lane to the adjacent lane. The method includes sending, by the electronic control unit, an indicator be displayed at an indicator display on a side-view mirror of the vehicle based upon the time duration.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for automatically predicting and preparing the vehicle to merge into an adjacent lane while minimizing vehicle response time. Particular embodiments of the subject matter described in this specification may be implemented to realize one or more of the following advantages.

A lane assist system predicts or determines when the vehicle intends to or is moving from a current lane to an adjacent lane. The lane assist system predictively prepares the vehicle to move from a current lane into an adjacent lane. By predictively preparing (e.g., using artificial intelligence (AI), sensors, and other algorithms and methods) the vehicle to move into the adjacent lane, the lane assist system enhances the vehicle's response in moving, changing, or merging the vehicle into an open space or area in an adjacent lane. This allows the vehicle to move into an open space or area that the vehicle is otherwise unable to move into.

Moreover, by predictively and/or proactively preparing the vehicle to move into the open space or area in the adjacent lane, the vehicle may utilize the battery, engine, motor or other energy source(s) more efficiently and effectively. For example, if the lane assist system identifies that the vehicle will be accelerating to move into an open space or area in the adjacent lane, the lane assist system may downshift to an appropriate gear to prepare the vehicle for the acceleration. By downshifting to an appropriate gear, instead of reactively responding to an abrupt depression of the accelerator pedal, the vehicle has sufficient power to accelerate the vehicle to a target speed and safely merge into the adjacent lane. The system may also activate another energy source(s) in order to accomplish the task. For example, a battery may be activated to allow the vehicle to provide instantaneous power to the vehicle for the desired lane change.

Moreover, the lane assist system can command an indicator be displayed at an indicator display—e.g., located at a side-view mirror of the vehicle—to inform a driver of the vehicle a time margin for the vehicle to make the lane change before an approaching adjacent vehicle reaches the vehicle. The indicator can change (e.g., shape, color, etc.) depending on the time margin remaining, thereby providing the driver with additional information to safely and efficiently determine whether and/or how to make the lane change. For example, a green light means a lane change can be done, a yellow light means a lane change needs to be done quickly, and a red light means do not make a lane change.

Figure 1:
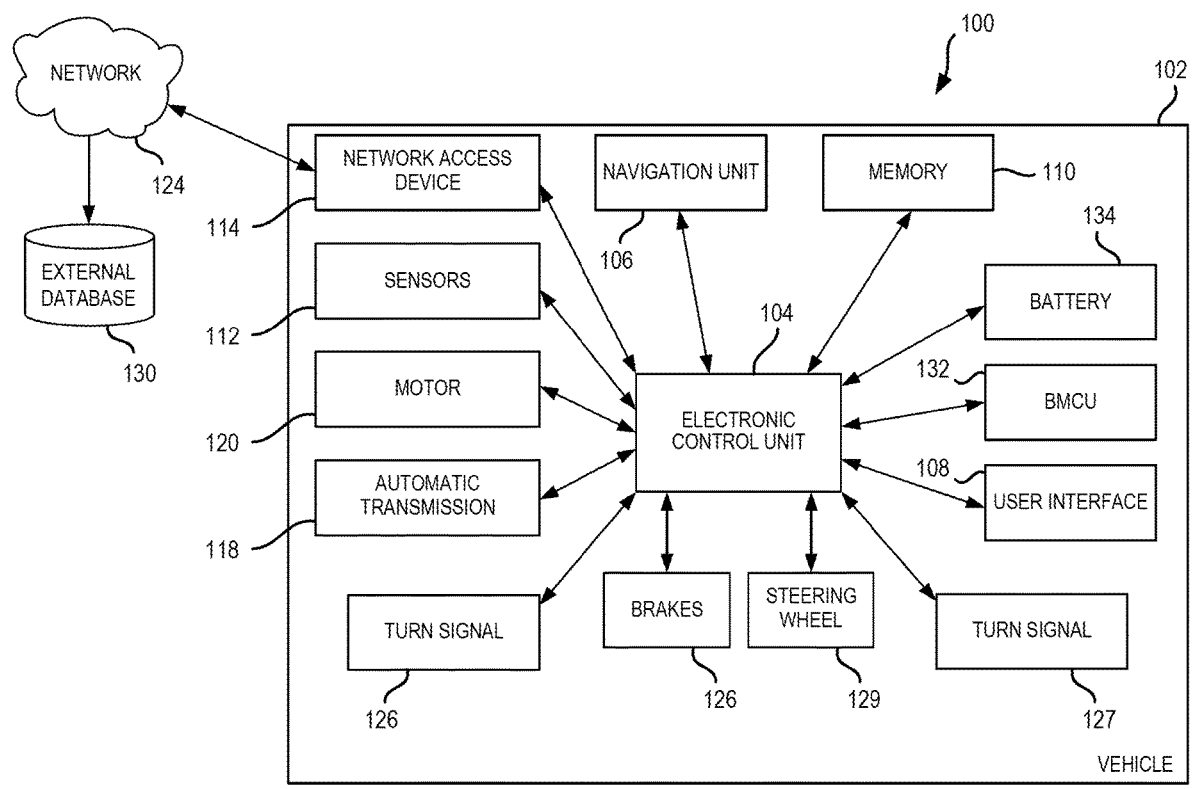
FIG. 1 is a block diagram of an example lane assist system for a vehicle according to an aspect of the invention.

FIG. 1 is a block diagram of an example lane assist system 100 for a vehicle 102. The lane assist system 100 includes one or more computers or electronic control units (ECUs) 104, appropriately programmed, to prepare the vehicle 102 to move into an open space or area in an adjacent lane. The lane assist system 100 may include one or more sensors 112, a navigation unit 106, a user interface 108, and a memory 110. The lane assist system 100 may, for example, downshift an automatic transmission 118 (or activate or energize the electric motor) to prepare the vehicle 102 for acceleration. The lane assist system 100 may, for example, selectively command one or more indicators to display at an indicator display to inform a driver of a relative speed and position of an approaching adjacent vehicle.

The lane assist system 100 may be included in a vehicle 102 and be connected to a network 124 that may assist in communicating with one or more sensors 112, the one or more external databases 130 or other components of the lane assist system 100. A vehicle 102 is a conveyance capable of transporting a person, an object, or a permanently or temporarily affixed apparatus. A vehicle 102 may be a self-propelled wheeled conveyance, such as a car, a sport utility vehicle, a truck, a bus, a van or other motor or battery driven vehicle. For example, the vehicle 102 may be an electric vehicle, a hybrid vehicle, a plug-in hybrid vehicle or any other type of vehicle that includes an automatic transmission 118. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may use one or more sensors 112 and/or navigation unit 106 to drive autonomously.

The vehicle 102 may be coupled to the network 124. The network 124, such as a local area network (LAN), a wide area network (WAN), a cellular network, a digital short-range communication (DSRC), the Internet, or a combination thereof, connects the vehicle 102, the one or more external databases 130 and/or components of the lane assist system 100. The external databases 130 may include databases from different service providers. A service provider may provide navigational map, weather, and/or traffic condition information to the vehicle 102.

A database is any collection of pieces of information that is organized for search and retrieval, such as by a computer, and the database may be organized in tables, schemas, queries, report, or any other data structures. A database may use any number of database management systems. An external database 130 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information may include a route that the vehicle 102 intends to travel. The route may include a starting location, a destination location and a path between the starting location and the destination location. The navigational map information may include terrain, political, traffic condition, roadway and/or construction information along the route. Political information includes political features such as cities, states, zoning ordinances, and laws and regulations, and traffic signs. Roadway information includes road features such the grade of an incline of a road and/or the boundaries of one or more lanes that make up the roadway. Construction information includes construction features such as construction zones and construction hazards. Traffic condition information includes one or more traffic condition features, such as a stop sign, traffic signal, traffic congested areas or accident areas. The traffic condition information may provide information related to the density and movement of vehicles on a roadway and/or accident locations. Traffic condition information may include real-time information of the traffic congested areas or accident areas. The real-time information may include the traffic in a particular lane. Terrain information may include terrain features, such as hills, flat terrains, or curves, and/or topographical information.

Features, e.g., terrain features, road features, political features, or traffic condition features, which may be derived from the terrain, roadway, political or traffic condition information, each have a location that may be identified by map coordinates. The map coordinates may be defined by latitude and longitudinal coordinates.

The vehicle 102 can include an automatic transmission 118 operatively coupled to a motor 120. The vehicle 102 can further include a battery 134 and a battery management and control unit (BMCU) 132. The BMCU 132 may be coupled to the battery 134. The BMCU 132 may be coupled to the battery 134 and control and manage the charging and discharging of the battery 134. The BMCU 132, for example, may measure, using battery sensors (not shown), parameters used to determine the state of charge (SOC) of the battery 134. The battery 134 may include one or more rechargeable batteries.

In various embodiments, the motor 120 is an electric motor. In this regard, the motor 120 can be an electric motor and an electric generator that converts electrical energy into mechanical power, such as torque, and converts mechanical power into electrical energy. The motor 120 may be coupled to the battery 134. The motor 120 may convert the energy from the battery 134 into mechanical power, and may provide energy back to the battery 134, for example, via regenerative braking. The battery 134 may be coupled to the motor 120 and may provide electrical energy to and receive electrical energy from the motor 120. The BMCU 132 may prepare the battery 134 to discharge electrical energy to provide to the motor 120 to accelerate the vehicle 102.

In various embodiments, the motor 120 is an internal combustion engine (ICE). In this regard, the motor 120 can combust fuel to provide power to the vehicle 102. The motor 120 can combust fuel to provide mechanical power, such as torque, to the automatic transmission 118. Accordingly, the motor 120 can cause the vehicle to accelerate, decelerate, or maintain a desired velocity. The motor 120 can include combinations of an ICE and/or an electric motor, such as for hybrid vehicle applications for example. One or more components (e.g., a torque converter) can be coupled between the motor 120 and the transmission 118 for transferring rotating power from the motor 120 to the automatic transmission 118.

Other power sources may include other types of fuel cells, such as hydrogen fuel cells. The vehicle 102 may include brakes 116 for slowing and/or stopping the vehicle 102.

The one or more ECUs 104 may be implemented as a single ECU or in multiple ECUs. The ECU 104 may be electrically coupled to some or all of the components of the vehicle 102. The ECU 104 may be coupled to the automatic transmission 118. The ECU 104 may be coupled to at least one of the navigation unit 106, the one or more sensors 112, the network access device 114 and/or the memory 110. The ECU 104 may include one or more processors or controllers specifically designed for controlling operations of the vehicle 102, such as shifting the automatic transmission 118. To down-shift, the ECU 104 can send a shift command signal to cause the automatic transmission 118 to down-shift. More particularly, the ECU 104 can send the shift command signal to a solenoid to actuate the solenoid to open and close clutches to change the ratio of input to output speed in the transmission. The ECU 104 may further control charging or discharging of the battery 134 and/or operating the one or more sensors 112 to provide situational awareness of the one or more vehicles surrounding the vehicle 102 in the adjacent lanes.

The memory 110 may be coupled to the ECU 104. The memory 110 may store instructions to execute on the ECU 104 and may include one or more of a RAM or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 104. The memory 110 may store vehicle parameters (e.g., vehicle weight, transmission gear information, etc.).

The network access device 114 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 114 may transmit data to and receive data from devices and systems not directly connected to the vehicle 102. For example, the ECU 104 may communicate with the external databases 130. Furthermore, the network access device 114 may access the network 124, to which the external databases 130 are also connected.

The one or more sensors 112 may be coupled to the ECU 104 and include a motion sensor, vehicle speed sensor, and/or one or more proximity sensors. The motion sensor measures the motion of the vehicle 102. The motion sensor may be an accelerometer, gyroscope, inertia measurement unit or other motion sensing device. The vehicle speed sensor measures the speed of the vehicle 102, for example, by measuring the total revolutions of the wheel per minute. The one or more proximity sensors may be positioned on the front, sides and/or rear of the vehicle 102 to detect surrounding vehicles and/or objects that are within a threshold distance of the vehicle 102 in the front, sides and/or back of the vehicle 102, respectively. The proximity sensor may use radar, sonar, LiDAR, a camera, vehicle-to-vehicle (V2V) communication or other means to detect and/or measure a distance to the other vehicles or objects. The one or more sensors 112 may include one or more cameras that may be used to identify a driver to determine a driver profile to be used as baseline for the driver behavior patterns. The one or more sensors 112 may include one or more cameras that may be used to identify a position of a driver's head and/or eyes. The one or more proximity sensors may be able to detect the speed and direction of travel of the one or more surrounding vehicles and/or the relative difference in speed and/or distance between two surrounding vehicles.

The navigation unit 106 may be coupled to the ECU 104 and provide vehicle information and/or navigational map information to the ECU 104. The navigation unit 106 may have or be connected to a Global Positioning System (GPS) device. The vehicle information may include the current position, location, direction of travel and/or speed of the vehicle 102.

The user interface 108 provides an interface to the driver and/or other occupant of the vehicle 102 to interact with or receive output from the ECU 104. The user interface 108 may have a user interface element, such as a touch-screen, button, knob, graphical user interface or other input/output device connected to the ECU 104 to provide input to the ECU 104 or output from the ECU 104, such as to display a notification or provide an indicator.

The user interface 108 can include a turn signal lever. For example, the user interface 108 can include a turn signal lever located on or at a steering column of the vehicle 102: though the turn signal lever can be located in any suitable location of the vehicle. When a driver is controlling a lane change maneuver, the driver can actuate or move the turn signal lever the of the user interface 108 in a first direction (e.g., downward, left, inward, etc.), thereby causing a first turn signal 126 (e.g., a driver side or a left side turn signal; also referred to as a direction indicator light) to operate. Conversely, the driver can actuate or move the turn signal lever of the user interface 108 in a second direction (e.g., upward, right, outward, etc.), thereby causing a second turn signal 127 (e.g., a passenger side or a right side turn signal: also referred to as a direction indicator light) to operate. For example, moving the turn signal lever downward can cause a left turn signal 126 to turn on and/or blink; whereas moving the turn signal lever upward can cause a right turn signal 127 to turn on and/or blink. Accordingly, the turn signals 126, 127 can include a light source, such as an LED light source, a light bulb, etc. Having described a turn signal lever that can be actuated upward or downward, it should be understood that a turn signal lever of the present disclosure can be actuated in any suitable direction (e.g., left, right, up, down, in, out, etc.) to cause a desired turn signal 126 to operate to indicate a change in direction (e.g., a lane change or a turn) of the vehicle 102 to other surrounding vehicles. Moreover, the user interface 108 can be implemented on a touch screen.

Figure 2:
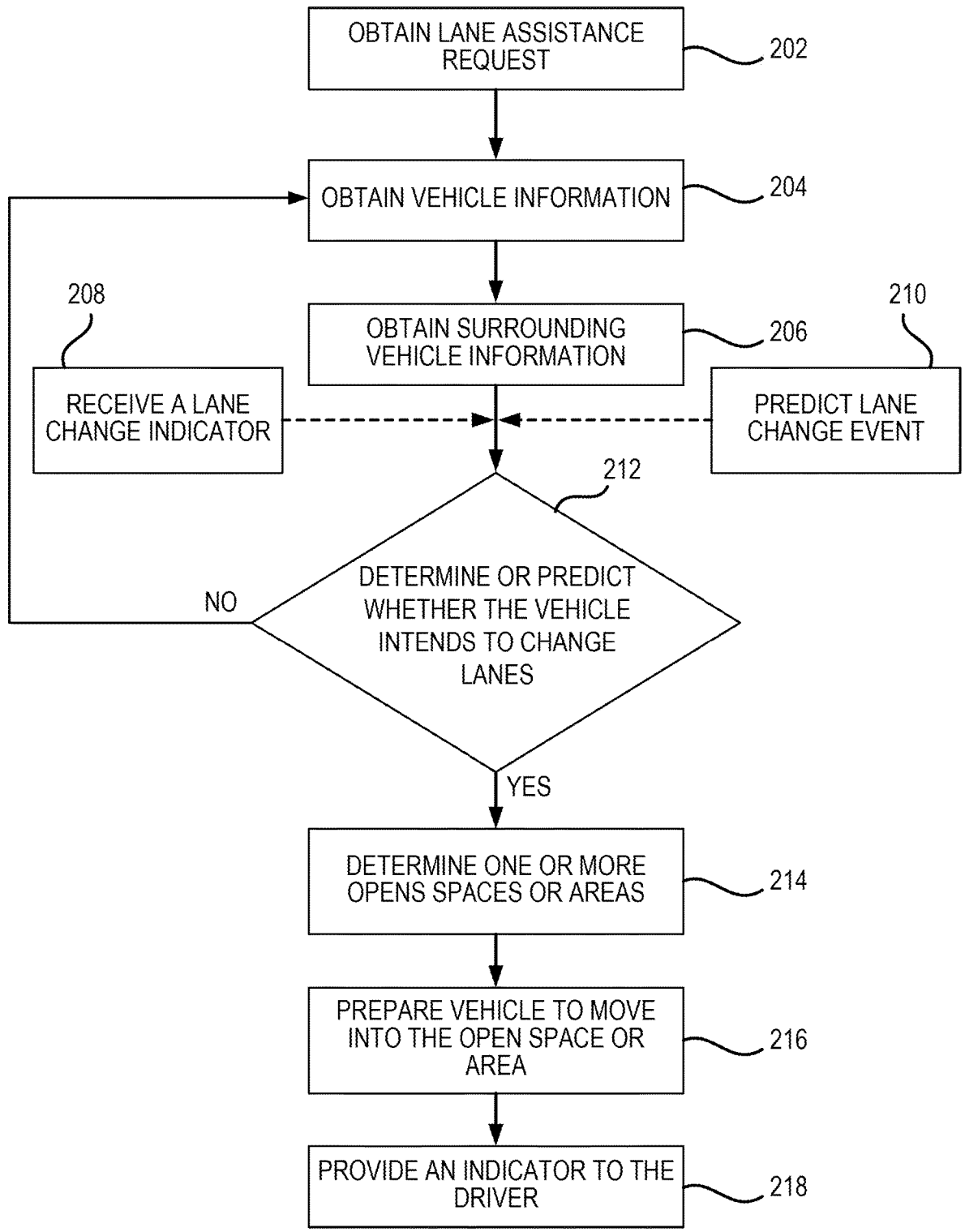
FIG. 2 is a flow diagram of an example process for preparing the vehicle to move into an open space or area in an adjacent lane according to an aspect of the invention.

FIG. 2 is a flow diagram of an example process 200 for preparing the vehicle 102 to move into an open space or area in an adjacent lane. One or more computers or one or more data processing apparatuses, for example, the ECU 104 of the lane assist system 100 of FIG. 1, appropriately programmed, may implement the process 200. For ease of description, the process 200 is described below with reference to FIG. 1. The process 200 of the present disclosure, however, is not limited to use of the exemplary lane assist system 100 of FIG. 1.

The lane assist system 100 may obtain a lane assistance request (202). The lane assistance request is a request to initialize the lane assist system 100. The lane assist system 100 can receive the lane assist request when the vehicle 102 becomes operational. The lane assist system 100 can receive the lane assist request when an occupant of the vehicle 102 activates the lane assist system 100, e.g., through the user interface 108.

The lane assist system 100 may receive the lane assist request from one or more sensors 112, such as an engine sensor, when the vehicle 102 is powered on. The lane assist system 100 may receive the lane assist request upon user activation, for example, when a token, such as a key, is inserted to start the vehicle 102. When the lane assist system 100 is initialized, the lane assist system 100 may display an indicator on the user interface 108 to indicate to the driver that the lane assist system 100 is initialized.

The lane assist system 100 may determine an identity of a driver during initialization. The lane assistance request may include the identity of the driver. The lane assist system 100 may receive user input, such as a user identification token, a user id or a fingerprint, which identifies the driver, to determine the identity of the driver. For example, a driver's key fob may uniquely identify the driver when the driver opens the door or is within proximity of the vehicle 102. In another example, the lane assist system 100 may obtain a user id from the driver, using the user interface 108, to identify the driver. The lane assist system 100 may use other user interface elements, such as a memory button that configures the position of a mirror or a seat, other sensors, such as a camera that uses facial recognition, or a combination of devices and/or techniques to identify the driver of the vehicle 102. The identity of the driver may be associated with driver behavior patterns that are stored in the memory 110.

The lane assist system 100 may obtain the driving behavior patterns of the driver. The memory 110 may have an internal database that associates the identity of the driver with previously stored driver behavior patterns using, for example, a driver profile. The lane assist system 100 may provide the identity of the driver to the internal database and receive the previously stored driver behavior patterns associated with the identity of the driver. The driver behavior patterns may include a rate or amount of acceleration or a rate or amount of change in the steering wheel for the identified driver in a particular driving situation that was previously recorded.

The particular driving situation that was previously recorded may include information gathered about the one or more surrounding vehicles, road condition information, traffic condition information and/or weather condition information. For example, the lane assist system 100 may have identified that the driver is "Jane Doe." The lane assist system 100 may have previously stored in the memory 110 in a driver profile that "Jane Doe" has a high rate or amount of acceleration and/or a high rate or amount of change in the steering wheel when another vehicle is in front of the vehicle 102 and other surrounding vehicles in an adjacent lane are travelling at a faster speed. The high rate or amount of acceleration and/or the high rate or amount of change in the steering wheel may indicate that "Jane Doe" has a higher tendency to switch lanes or is more aggressive than "John Doe" who has a lower rate or amount of acceleration and/or a lower rate or amount of change in the steering wheel when driving. That is, "John Doe" is less likely to abruptly accelerate and switch lanes when another vehicle is in front of the vehicle 102 even though other surrounding vehicles in adjacent lanes are travelling at a faster speed.

The previously stored driver behavior patterns may be recorded and stored on a previously-travelled route that the driver traversed using the vehicle 102. The identity of the driver and the driver behavior patterns may be associated in the memory 110.

The lane assist system 100 obtains vehicle information of the vehicle 102 (204). The vehicle information may include a current location, direction of travel and/or speed of the vehicle 102. The vehicle information may include a route of travel for the vehicle 102. The lane assist system 100 may obtain the vehicle information using the navigation unit 106 or one or more sensors 112. For example, a vehicle speed sensor may detect the current speed of the vehicle 102. In another example, the navigation unit 106, using a Global Position System (GPS) device, may obtain the current speed, location and/or direction of travel of the vehicle 102.

The lane assist system 100 may obtain surrounding vehicle information (206). The surrounding vehicle information may include the one or more locations of the one or more vehicles surrounding the vehicle 102. The one or more locations of the one or more vehicles surrounding the vehicle 102 may be in one or more lanes. The one or more lanes may be adjacent to the lane that the vehicle 102 is currently traveling in.

The lane assist system 100 may detect the one or more surrounding vehicles using one or more sensors 112, such as a proximity sensor, or a camera. The detection of the one or more surrounding vehicles may be done continuously or regularly, such that the vehicle 102 constantly monitors the surrounding environment for one or more surrounding vehicles. For example, the proximity sensor may detect one or more surrounding vehicles in one or more adjacent lanes that are within a threshold distance of the proximity sensor. The lane assist system 100 may request the surrounding vehicle information from an external database 130 and based on the current location of the vehicle 102 that is provided to the external database 130 obtain the surrounding vehicle information for the one or more vehicles within a threshold distance of the vehicle 102 or traveling on the same roadway or nearby roadway that the vehicle 102 is travelling on. The detection may be done to determine or predict one or more open spaces or areas that the vehicle 102 may move into.

The surrounding vehicle information may include a speed, a distance, and/or a position of the surrounding vehicles. The surrounding vehicle information may include a relative speed, a distance, and/or a position between two vehicles. The relative speed, the distance, and/or the position may be relative between two surrounding vehicles or between the vehicle 102 and one of the surrounding vehicles. For example, the lane assist system 100 may obtain surrounding vehicle information using the one or more sensors 112 or from a third-party server that indicates that a first vehicle is traveling a particular distance, such as 2 feet, in front of a second vehicle in an adjacent lane. Additionally, the lane assist system 100 may obtain surrounding vehicle information that indicates that the first vehicle is traveling faster than the second vehicle, such that the distance between the first and second vehicle is increasing. The lane assist system 100 may calculate a difference between the speeds and/or positions of the two vehicles to determine the relative speed, the distance, and/or the position of the surrounding vehicles.

The lane assist system 100 may receive a lane change indicator (208). The lane change indicator may be provided by the user interface 108, e.g., a turn signal lever. The lane change indicator may be provided by any device or sensor 112, e.g., a turn signal, steering wheel or camera, that may indicate that the driver intends to change, move or merge the vehicle 102 into another lane. The lane change indicator may be initiated by the driver. For example, the lane assist system 100 may receive the indication from the turn signal when the driver initiates the turn signal 126 and/or 127 using the user interface 108 (e.g., a turn signal lever) to signal to other drivers that the driver intends to move the vehicle 102 in a particular direction.

The lane assist system 100 may predict that there will be a lane change event (210). The lane assist system 100 may use the one or more sensors 112, such as a camera, to predict that there will be a lane change event. A lane change event is when the vehicle 102 moves from a current lane to an adjacent lane. The lane assist system 100 may determine that there will be a lane change event when the one or more sensors 112 determine that the vehicle 102 is approaching a lane boundary and/or is within a threshold distance of a lane boundary which may indicate that the vehicle 102 will cross over the lane boundary into the adjacent lane.

In some implementations, a camera may capture an image. The lane assist system 100 may use the image to identify the lane boundary and determine a distance from the wheel or side of the vehicle 102 to the lane boundary based on the image. If the distance is less than a threshold distance, the lane assist system 100 may predict that there is a lane change event.

In various embodiments, the lane assist system 100 may use the image to detect a position of the driver's head or the driver's eyes. For example, a camera may capture an image of the driver's head and/or the driver's eyes and, in response to the lane assist system 100 detecting that the driver is looking at a side-view mirror, or is turning in a particular direction indicative of the driver about to make, or contemplating, a lane change, the lane assist system 100 can predict that a lane change event is imminent. For example, the lane assist system 100 can predict a lane change event in response to the driver's head and/or eyes turning and/or pointing toward a side-view mirror.

The lane assist system 100 may predict that there will be a lane change event based on the surrounding vehicle information or navigational map information, such as traffic condition information. The lane assist system 100 may determine that traffic in front of the vehicle 102 is slowing or at a stop and/or traffic in one or more adjacent lanes is travelling faster than the vehicle 102 based on the surrounding vehicle information or the traffic condition information. The lane assist system 100 may predict that there is a lane change event if the traffic upfront is slowing or stopped and/or the traffic in one or more adjacent lanes is travelling faster than the traffic in the current lane of the vehicle 102.

The lane assist system 100 determines or predicts whether the vehicle intends to move or is moving to another lane, such as an adjacent lane, based on the lane change indicator and/or the predicted lane change event (212). The lane assist system 100 may determine or predict whether the vehicle 102 intends to move or is moving to another lane, automatically or autonomously, based on the predicted lane change event, or based on driver input, such as from the lane change indicator. A weighted combination of the lane change event or the lane change indicator may be used to calculate the likelihood that the vehicle 102 intends to move to another lane. If the likelihood is greater than or equal to a threshold amount, the lane assist system 100 may determine or predict that the vehicle 102 intends to or is moving from a current lane to another lane.

The lane assist system 100 may determine or predict the movement of the vehicle 102 based on navigational map information and/or a driver's behavior patterns. The lane assist system 100 may use the navigation unit 106 to obtain the navigational map information from one or more external databases 130. For example, if the turn indicator is on and there is no upcoming turn determined from the navigational map information, the lane assist system 100 may predict and/or determine that there is a high probability that the vehicle 102 intends to move or change lanes. In another example, if the predicted route as obtained from the navigational map information has the vehicle 102 exiting soon but the vehicle 102 is in the middle lane, the lane assist system 100 may predict that the vehicle 102 intends to move and/or change lanes so that the vehicle 102 is in the adjacent lane that is exiting.

The lane assist system 100 may obtain the driver behavior patterns that are stored in the memory 110. The lane assist system 100 may account for a driver's behavior pattern and aggressiveness in moving or changing lanes when predicting whether the vehicle 102 intends to or is moving to another lane. For example, a more aggressive driver is more likely to change lanes when the traffic in the adjacent lanes is travelling faster than the current lane of the vehicle 102. Whereas, a more timid driver is less likely to change lanes.

If the lane assist system 100 determines that the vehicle 102 does not intend to move, change or merge into another lane, the lane assist system 100 continues to monitor the vehicle 102 and the surrounding vehicles.

Figure 3:
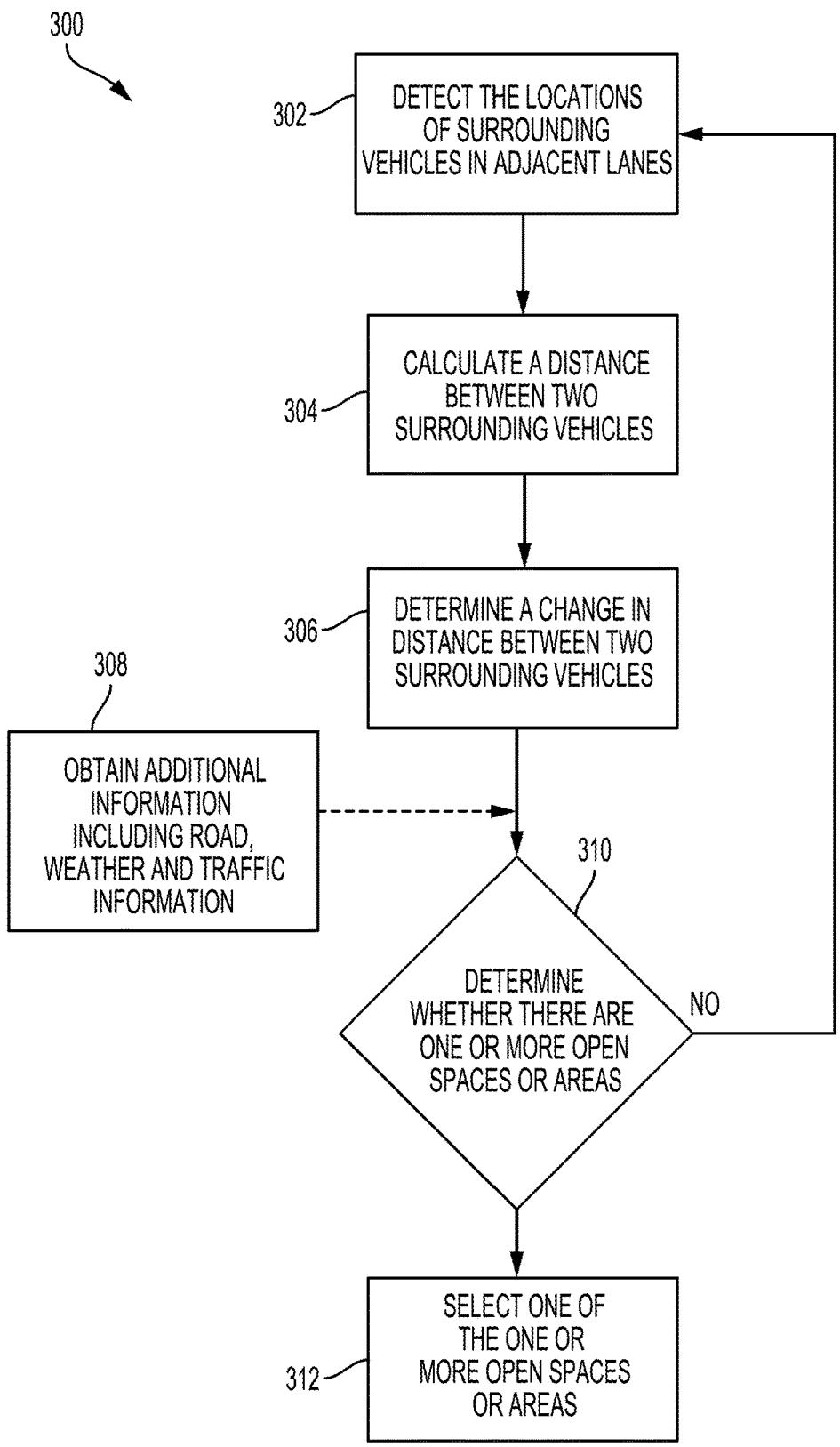
FIG. 3 is a flow diagram of an example process for obtaining the surrounding vehicle information and selecting an open space or area in an adjacent lane for preparing the vehicle to move into an open space or area in an adjacent lane according to an aspect of the invention.

In response to determining that the vehicle 102 intends to move, change, or merge into another lane, the lane assist system 100 may determine or predict the locations of one or more open spaces or areas in the one or more adjacent lanes based on the vehicle information and the surrounding vehicle information (214). The lane assist system 100 uses the surrounding vehicle information including the speed, distances and/or positions of the surrounding vehicles to determine or predict the locations of one or more open spaces or areas surrounding the vehicle 102. The lane assist system 100 selects one of the one or more open spaces or areas in the one or more adjacent lanes to prepare the vehicle 102 to move or merge into 220. FIG. 3 further describes the process 300 of determining and selecting an open space or area to prepare the vehicle 102 to move into.

Once an open space or area is determined or predicted, the lane assist system 100 prepares the vehicle to move into the open space or area (216). The lane assist system 100 determines or predicts whether the open space or area requires that the vehicle 102 accelerate, decelerate, or remain at a constant speed to move the vehicle 102 into the open space or area. The lane assist system 100 may base the determination or prediction on the vehicle information and the surrounding vehicle information, and in particular, the location of the open space or area and the location of the vehicle 102.

The lane assist system 100 may prepare to decelerate the vehicle 102 if the location of the open space or area is determined or predicted to be behind the vehicle 102 in the adjacent lane. The lane assist system 100 may prepare to decelerate the vehicle 102 when the location of the open space or area is in front of the vehicle 102 and the distance between the open space or area and the vehicle 102 is decreasing. This may occur, for example, when the two vehicles that form the open space or area in the adjacent lane are in front of the vehicle 102 but travelling at a slower speed than the vehicle 102, such that the open space or area is approaching the vehicle 102. The driver, for example, may intend to ease into the open space or area.

The lane assist system 100 may perform operations, such as de-spooling the motor 120, partially closing the throttle valve, and/or managing the power flow of the battery 134 using the BMCU 132 to prepare to store electrical energy generated from the regenerative brakes to prepare the vehicle for deceleration. Other operations may include turning the motor 120 off, initializing the regenerative brakes, opening a clutch, up-shifting the vehicle 102, down-shifting the vehicle 102, or other operations to support deceleration of the vehicle 102.

The lane assist system 100 may prepare to accelerate the vehicle 102 if the location of the open space or area is determined or predicted to be in front of the vehicle 102 in the adjacent lane or if a rear adjacent vehicle is approaching the open space or area (i.e., a rear adjacent vehicle is traveling faster than the vehicle 102. The lane assist system 100 may prepare to accelerate the vehicle 102 when the location of the open space or area is behind the vehicle 102 and the distance between the open space or area and the vehicle 102 is decreasing. This may occur, for example, when the two vehicles that form the open space or area in the adjacent lane are behind the vehicle 102 but travelling at a faster speed than the vehicle 102, such that the open space or area is approaching the vehicle 102. The driver may, for example, intend to merge into the open space or area.

The lane assist system 100 may perform operations, such as down-shifting the automatic transmission 118 to prepare the vehicle 102 for acceleration. Other operations may include spooling the motor 120, turning the motor 120 on, partially opening the throttle valve, and/or preparing the battery 134 using the BMCU 132 to provide electrical energy generated to the motor 120 to prepare the vehicle 102 for acceleration. Other operations may include initializing the motor 120 to convert fuel energy into electrical energy to prepare the vehicle 102 for acceleration. The degree of preparation of the operation may depend on an amount of acceleration or deceleration the lane assist system 100 anticipates utilizing to move the vehicle 102 into the open space or area. The amount may be based on the distance between the vehicle 102 and the open space or area that the vehicle 102 plans to move into. Accordingly, the particular gear that the ECU 104 causes the automatic transmission 118 to down-shift into can depend on an amount of acceleration the lane assist system 100 anticipates utilizing to move the vehicle 102 into the open space or area.

The lane assist system 100 may prepare to maintain a constant speed for the vehicle 102 if the location of the open space or area is determined or predicted to be next to the vehicle 102 in the adjacent lane. The lane assist system 100 may perform operations, such as maintaining the current speed of the vehicle 102 by implementing the cruise-control feature to maintain a current state of the motor 120, the regenerative brakes 116, the battery 134 and/or the BMCU 132. The preparation of the vehicle 102 to perform operations, such as accelerating, decelerating, or maintaining a constant speed includes, but is not limited to, the preparation of fuel energy sources and non-fuel energy sources and the preparation of fuel energy propulsion components and non-fuel energy propulsion components. Fuel energy sources include gasoline or diesel-powered engines. Non-fuel energy sources include fuel cells, such as hydrogen and/or electric fuel cells.

The lane assist system 100 may provide an indicator to the driver through the user interface 108 when the lane assist system 100 is preparing the vehicle 102 to merge into another lane (218). The indicator may be an audio and/or visual indication that indicates to the driver that the lane assist system 100 is preparing, or has already prepared, the vehicle 102 to accelerate, decelerate, or maintain a constant speed to move into another lane. The lane assist system 100 may store the indicator in the memory 110 to act as a flag to indicate the lane assist system 100 is preparing, or has already prepared, the vehicle 102 to move into an adjacent lane. The indicator may reset once the vehicle 102 has moved into the adjacent lane or the preparation has been overridden.

FIG. 3 is a flow diagram of an example process 300 for obtaining the surrounding vehicle information and selecting an open space or area in an adjacent lane for preparing the vehicle 102 to move into. One or more computers or one or more data processing apparatuses, for example, the ECU 104 of the lane assist system 100 of FIG. 1, appropriately programmed, may implement the process 300.

The lane assist system 100 detects or obtains the one or more locations of the one or more surrounding vehicles in the one or more adjacent lanes based on the current location of the vehicle 102 that may be included in the navigational map information (302). The navigational map information may be obtained using the navigation unit 106. The one or more surrounding vehicles may be vehicles within a proximity or particular distance of the current location of the vehicle 102. The one or more surrounding vehicles may be determined by obtaining surrounding vehicle information from one or more external databases 130, a proximity sensor, one or more external databases 130 or by using Vehicle-to-Vehicle (V2V) communication. The lane assist system 100 calculates or determines the surrounding vehicle information including the speed, distances or positions of the surrounding vehicles and/or the relative distances, positions, or difference in speed between two vehicles.

The relative speeds, distances, and/or positions of the two vehicles may indicate that there is an open space or area if the distance between the two vehicles is greater than a threshold amount. The lane assist system 100 calculates a distance between the two surrounding vehicles to determine a size of the open space or area (304). The lane assist system 100 may calculate a difference between the positions of the two surrounding vehicles to determine the distance and/or size of the open space or area between the two surrounding vehicles.

The lane assist system 100 may determine the change in distance or size of the open space or area between the two surrounding vehicles (306). The lane system may calculate the change in the size of the open space or area based on the speed of the two vehicles or the positions of the two vehicles over a period of time.

The lane assist system 100 may obtain additional information including road condition, weather condition, and/or traffic condition information (308). The additional information may be included in the navigational map information obtained from the navigation unit 106 or obtained from one or more external databases 130. The additional information may be used to determine if there are one or more open spaces or areas in the one or more adjacent lanes.

The lane assist system 100 determines whether there are one or more open spaces or areas in an adjacent lane (310). The lane assist system 100 may compare the determined distance or size of the open space or area between two vehicles to a threshold value, and if the determined distance is greater than or equal to the threshold value, the lane assist system 100 may determine that there is an open space or area. For example, if the distance between the two vehicles in an adjacent lane is 1.5 car lengths, or approximately 12 feet, which is greater than a threshold value, such as 8 feet or 1 car length, the lane assist system 100 may determine that there is an open space or area in the adjacent lane. The threshold value may be variable, such that the threshold value may be based on the speed of the two vehicles in the adjacent lane that form the open space or area. The threshold value may be based on other factors, such as weather information, traffic information, and/or road condition information. If the lane assist system 100 does not detect or determine that there is a vehicle in front or behind a surrounding vehicle in an adjacent lane, the lane assist system 100 may determine that the open space or area is of a size greater than the threshold value, i.e., of sufficient size to move into.

If the lane assist system 100 determines that there are no open spaces or areas, the lane assist system 100 returns to monitoring the location of the surrounding vehicles. If the lane assist system 100 determines that there are open spaces or areas, the lane assist system 100 selects one of the one or more open spaces or areas. The lane assist system 100 selects one of the one or more open spaces or areas (312). The lane assist system 100 may select the one of the one or more open spaces or areas to prepare the vehicle 102 to move into based on driver behavior patterns and/or navigational map information including traffic condition information and/or the route. For example, if the stored driver behavior patterns indicate that the driver is more aggressive, the lane assist system 100 may select an open space or area that is in front of the vehicle 102 or in an adjacent lane where the flow of traffic is traveling faster than the current lane the vehicle 102 is travelling in. If, however, the stored driver behavior patterns indicate that the driver is more passive, the lane assist system 100 may select an open space or area that is behind the vehicle 102. The lane assist system 100 may select the one of the one or more open spaces or areas based upon a selection by the driver using the user interface 108 (e.g., a left turn signal or a right turn signal).

The lane assist system 100 may use the navigational map information to determine which one of the one or open space or areas to select. For example, if the traffic condition information included in the navigational map information indicates that there is traffic in the adjacent lane to the right, the lane assist system 100 may select an open space or area in the adjacent lane to the left. In another example, if the route that the vehicle 102 is travelling has the vehicle 102 exiting and the vehicle 102 is in the middle lane as the highway exit approaches, the lane assist system 100 may select an open space or area in the exit lane that allows the vehicle 102 to safely exit in time.

Figure 4A:
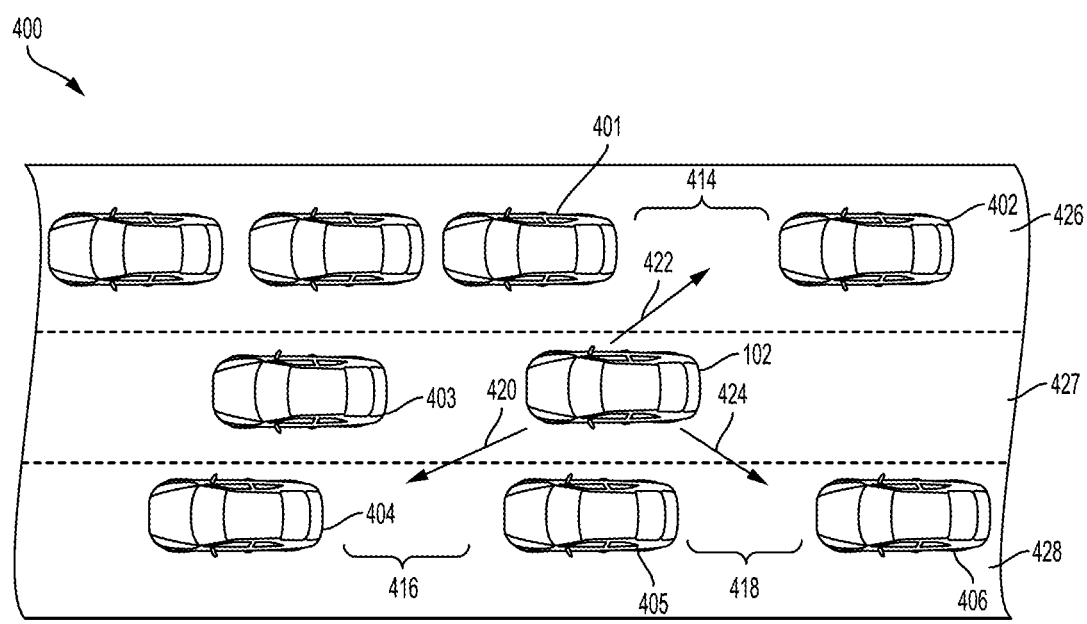
FIGS. 4A-4C show example illustrations of use cases of when the lane assist system of FIG. 1 may be used to prepare the vehicle to move from a current lane to an adjacent lane according to an aspect of the invention.
Figure 4B:
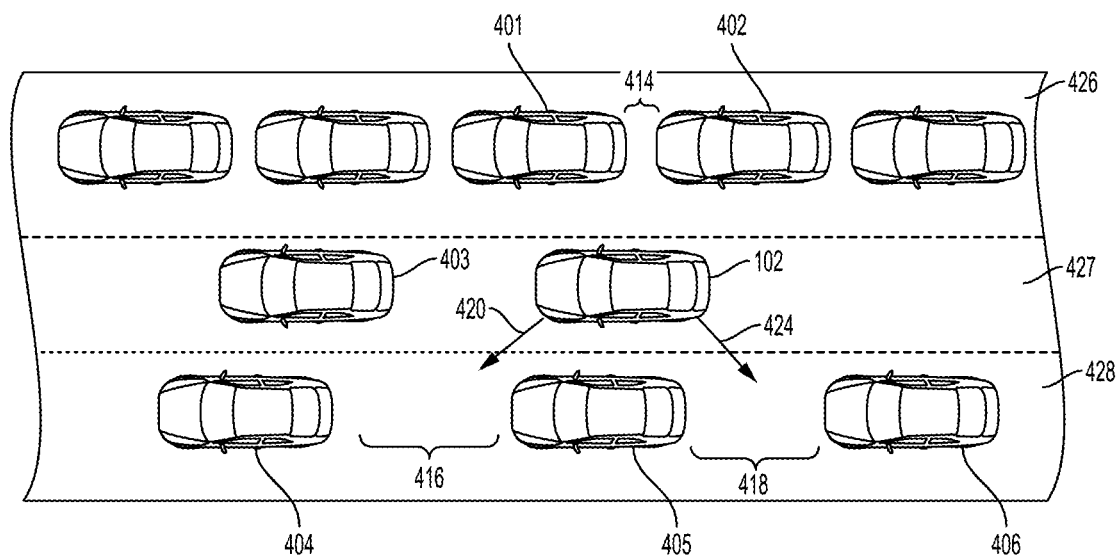
Figure 4C:
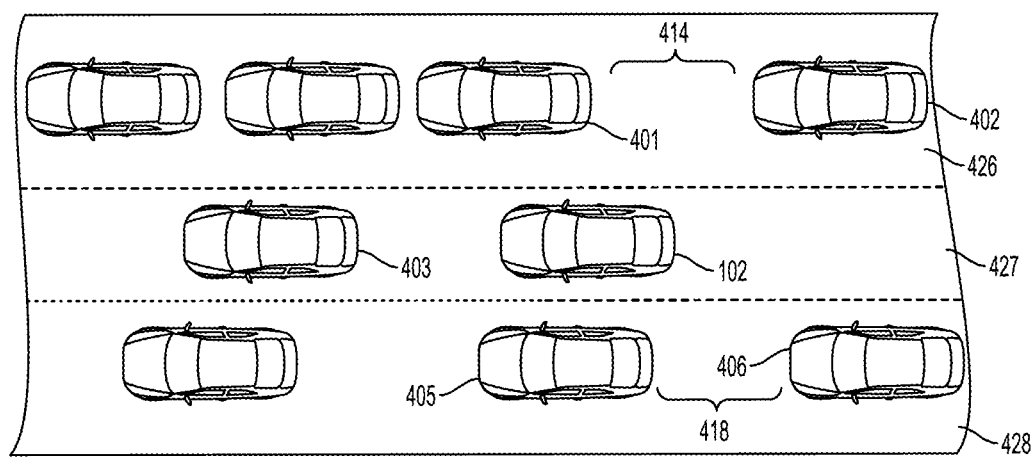

FIG. 4A, FIG. 4B, and FIG. 4C show illustrations of use cases of when the lane assist system 100 of FIG. 1 prepares a vehicle 102 to move from a current lane to an adjacent lane. FIG. 4A shows a vehicle 102 with the lane assist system 100 traveling on a roadway, such as a highway. The vehicle 102 is surrounded by one or more surrounding vehicles 401-406. The lane assist system 100 may use one or more sensors 112, such as a proximity sensor, or access one or more external databases 130 to obtain and/or determine the surrounding vehicle information including the one or more locations of the one or more surrounding vehicles 401-406. The lane assist system 100 may predict or determine one or more open spaces or areas 414, 416, 418 in the adjacent lanes 426, 428 for the vehicle 102 to move into.

The lane assist system 100 of the vehicle 102 may determine or predict that the vehicle 102 intends to move into an adjacent lane 426, 428 from the current lane 427 and determine which one of the one or more open spaces or areas 414, 416, 418 the vehicle 102 intends to move into. The lane assist system 100 may calculate the size of the one or more open spaces or areas 414, 416, 418 and/or a distance between the vehicles 401, 402, the vehicles 404, 405 and/or the vehicles 405, 406, respectively. If the size of the one or more open spaces or areas 414, 416, 418 is greater than a threshold size, i.e., the distance between the vehicles is greater than a threshold distance, the open space or area corresponding to the size that is greater than a threshold size may be a viable open space or area for the vehicle 102 to move into.

The lane assist system 100 may determine which of the one or more open spaces or areas to move into based on driver behavior patterns, road condition information, navigational map information or other information. The lane assist system 100 may prepare the vehicle 102 to move or merge the vehicle 102 into the adjacent lane 426, 428. The lane assist system 100 prepares the vehicle 102 for acceleration if the lane assist system determines that the vehicle 102 is to move into the open space or area 416, e.g., in direction 420, or for deceleration if the lane assist system 100 determines that the vehicle 102 is moving into the open spaces or areas 414, 418, e.g., in direction 422, 424, respectively.

FIG. 4B shows a vehicle 102 with the lane assist system 100 traveling on a roadway, such as a highway, where the lane assist system 100 encounters an override event. The lane assist system 100 may initially determine to prepare the vehicle 102 to move in direction 420 or 424 to move into an open space or area 416 or 418, respectively. The lane assist system 100 may determine that there may be an override event that prevents the vehicle 102 from moving into one of open spaces or areas 416, 418. The lane assist system 100 may determine that the adjacent lane 428 merges into the current lane 427 based on navigational map information that indicates that the adjacent lane 428 moves into current lane 427. Thus, the vehicle 102 is unable to move into the open spaces or areas 416, 418, and so disengages preparation of the vehicle 102. The lane assist system 100 may determine that the adjacent lane 426 is filled with traffic based on traffic condition information included in the navigational map information or based on the surrounding vehicle information, e.g., by determining that the distance between the two vehicle 401, 402 is less than a threshold distance or that the size of the open space or area 414 is less than a threshold amount. If there is traffic in the adjacent lane 426 and/or the size of the open space or area 414 is less than the threshold amount, the lane assist system 100 may not prepare the vehicle 102 to move into the adjacent lane 426.

FIG. 4C shows a vehicle 102 with the lane assist system 100 traveling on a roadway, such as a highway, where the lane assist system 100 chooses between different open spaces or areas to move into. The lane assist system 100 may determine that the vehicle 102 is unable to move into the open spaces or areas 416, 418 because the adjacent lane 428 merges into the current lane 427 based on the navigational map information. Instead, as the vehicle 403 slows down, the lane assist system 100 may predict that the vehicle 102 intends to move into the open space or area 414 in the adjacent lane 426.

Figure 5:
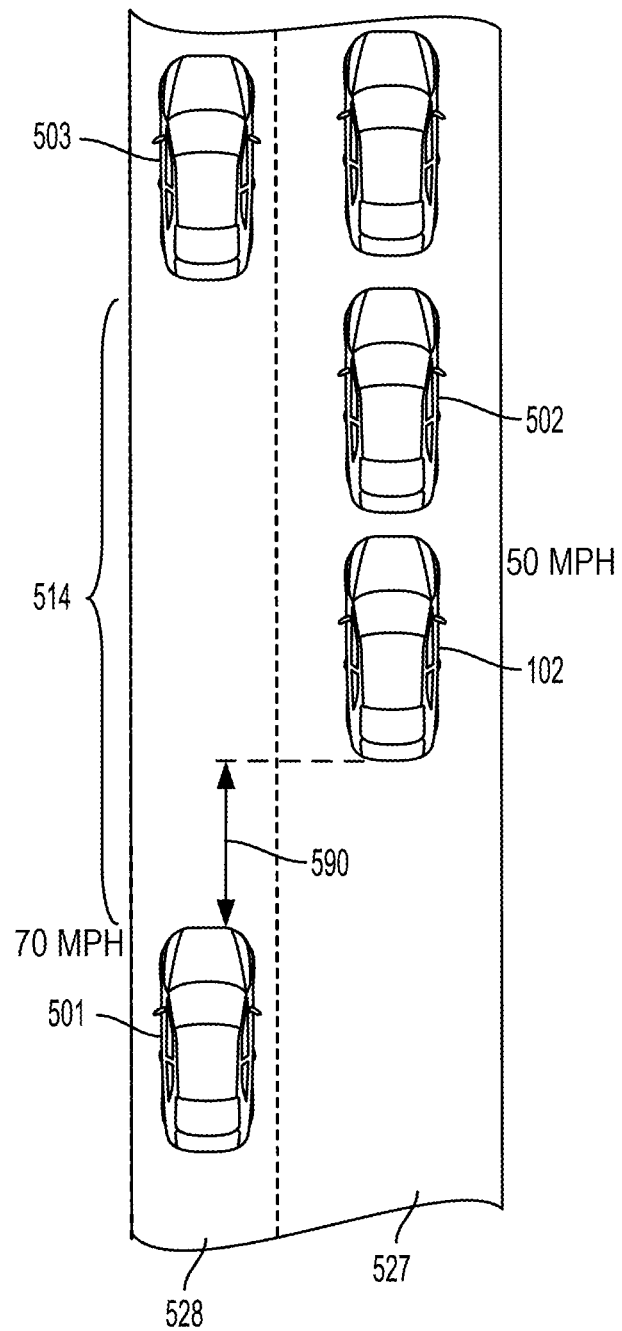
FIG. 5 shows an example illustration of a use case of when the lane assist system of FIG. 1 may be used to prepare the vehicle to move from a current lane to an adjacent lane according to an aspect of the invention.

FIG. 5 shows a vehicle 102 with the lane assist system 100 traveling on a roadway, such as a highway. The vehicle 102 is surrounded by one or more surrounding vehicles 501, 502, 503. The lane assist system 100 may use one or more sensors 112, such as a proximity sensor, or access one or more external databases 130 to obtain and/or determine the surrounding vehicle information including the one or more locations of the one or more surrounding vehicles 501, 502, 503. The lane assist system 100 may predict or determine one or more open spaces or areas 514 in the adjacent lane 527 for the vehicle 102 to move into. The vehicle 102 may be following behind traffic (e.g., vehicle 502) moving slower than the speed limit. The lane assist system 100 may use one or more sensors 112 (e.g., rear camera, rear sonar, etc.) to monitor the speed of approaching vehicles (e.g., vehicle 501) in the faster adjacent lane 528. In response to the lane assist system 100 determining the vehicle 102 intends to change lanes (e.g., the driver activates a turn signal to indicate a move to the faster adjacent lane 528), the lane assist system 100 can prepare the vehicle 102 to move into the adjacent lane 528 by down-shifting the automatic transmission into a gear that can most effectively meet the acceleration requirement to increase the speed of vehicle 102 to match a target speed (e.g., the speed of adjacent vehicle 501) of the moving traffic within the open space or area 514 between the vehicles. This acceleration value can be based upon the speed of vehicle 102, the speed of adjacent vehicle 501, and the distance 590 between the vehicle 102 and the adjacent vehicle 501.

In various embodiments, the lane assist system 100 performs continuous background calculations to determine a duration of time for the adjacent vehicle 501 to reach the vehicle 102 (i.e., the time duration for the distance 590 to reach zero). For example, the lane assist system 100 can determine a difference in speed between the vehicle 102 and the adjacent vehicle 501 ($spd_{delta}$), for example as follows:

$$spd_{delta} = spd_{approach} - spd_{current} \qquad \text{Eq. 1}$$

where $spd_{approach}$ is the speed (70 MPH in the illustrated embodiment) of the approaching adjacent vehicle 501 and $spd_{current}$ is the speed (50 MPH in the illustrated embodiment) of the vehicle 102 having the lane assist system 100.

The lane assist system 100 can further determine and/or calculate a vehicle mass (Mveh) of the vehicle 102. The vehicle mass, or components thereof, can be stored in the memory 110. The vehicle mass can be calculated taking into account the weight of onboard persons or items, e.g., payload weight, fuel weight, etc.

The lane assist system 100 can further determine a driving force of each gear of the automatic transmission 118 ($DF_{gear\#}$) based on a look-up table. For example, the look-up table can be stored in the memory 110.

The lane assist system 100 can further determine a maximum acceleration of each gear of the automatic transmission 118 ($Accel_{gear\#}$) based on the calculated mass, for example as follows:

$$Accel_{gear\#}=DF_{gear\#}/Mveh \qquad \text{Eq. 2}$$

The lane assist system 100 can further determine a time duration to meet (e.g., accelerate from the current speed of the vehicle 102 to the speed of the adjacent vehicle 501) the speed of the approaching adjacent vehicle 501 for each gear ($Time_{gap\_gear\#}$), for example as follows:

$$Time_{gap\_gear\#}=spd_{delta}/Accel_{gear\#} \qquad \text{Eq. 3}$$

The lane assist system 100 can further determine a time duration for the approaching adjacent vehicle 501 to reach the vehicle 102 with the lane assist system 100 ($Time_{approach}$), for example as follows:

$$Time_{approach}=distance_{approach}/spd_{delta} \qquad \text{Eq. 4}$$

where $distance_{approach}$ is the distance 590 between the vehicle 102 and the adjacent vehicle 501. Stated differently, the lane assist system 100 can calculate a quotient of the distance between the vehicle 102 and the adjacent vehicle 501 ($distance_{approach}$) divided by the speed difference ($spd_{delta}$) between the speed of the adjacent vehicle 501 and the speed of the vehicle 102.

The lane assist system 100 can further determine a time margin ($Time_{margin}$) for passing based on a gear of interest of the automatic transmission 118, for example as follows:

$$Time_{margin\_gear\#}=Time_{approach}-Time_{gap\_gear\#} \qquad \text{Eq. 5}$$

Stated differently, the time margin ($Time_{margin\_gear\#}$) can be the difference between the time duration for the approaching adjacent vehicle 501 to reach the vehicle 102 ($Time_{approach}$) and the time duration for the vehicle 102 to meet (e.g., accelerate from the current speed of the vehicle 102 to the speed of the adjacent vehicle 501) the speed of the approaching adjacent vehicle 501 for a particular gear ($Time_{gap\_gear\#}$). The time margin ($Time_{margin\_gear\#}$) can be useful in determining how much time is remaining, and whether, to initiate a lane change. The time margin ($Time_{margin\_gear\#}$) can be useful in determining which gear of the automatic transmission 118 for the ECU 104 to select. The time margin ($Time_{margin\_gear\#}$) can be useful in determining which indicator (e.g., a first, second, or third indicator) to display at the indicator display (see FIG. 7).

Figure 6:
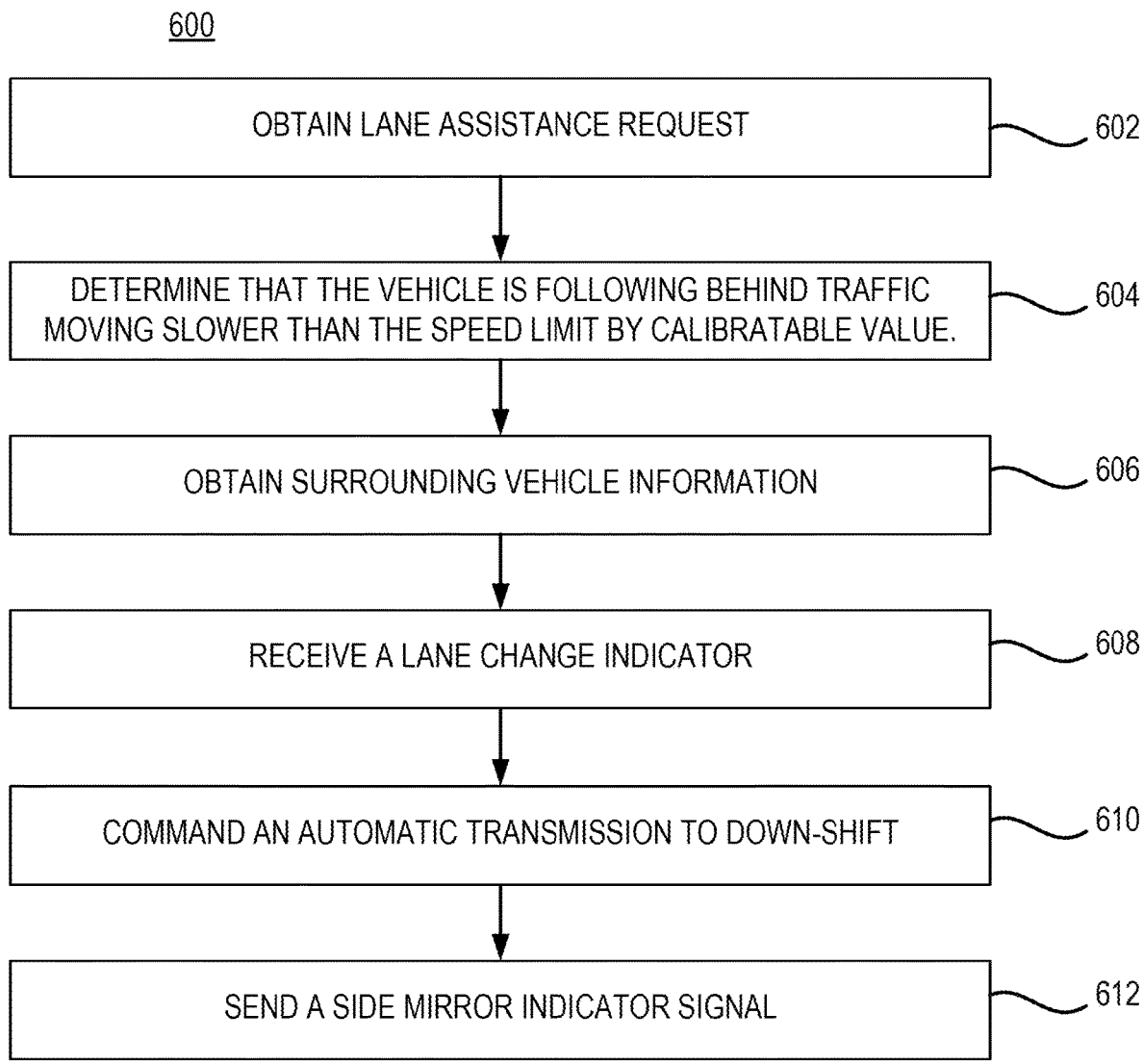
FIG. 6 is a flow diagram of an example process for controlling the lane assist system of FIG. 1 for preparing the vehicle to merge into an adjacent lane according to an aspect of the invention.

FIG. 6 is a flow diagram of an example process 600 for preparing the vehicle 102 to move into an open space or area in an adjacent lane. One or more computers or one or more data processing apparatuses, for example, the ECU 104 of the lane assist system 100 of FIG. 1, appropriately programmed, may implement the process 600. For ease of description, the process 600 is described below with reference to FIG. 1. The process 600 of the present disclosure, however, is not limited to use of the exemplary lane assist system 100 of FIG. 1.

The lane assist system 100 may obtain a lane assistance request (602). The lane assistance request is a request to initialize the lane assist system 100. The lane assist system 100 can receive the lane assist request when the vehicle 102 becomes operational. The lane assist system 100 can receive the lane assist request when an occupant of the vehicle 102 activates the lane assist system 100, e.g., through the user interface 108.

The lane assist system 100 may determine that the vehicle 102 is following behind traffic (e.g., the vehicle 502 of FIG. 5) moving slower than the speed limit by a calibratable value (604). During that time the one or more sensors 112 (e.g., rear camera and LiDAR and/or sonar sensors) monitor the speed of approaching adjacent cars in the faster lane (606). The ECU 104 can use the sensors 112 to monitor surrounding vehicles as described with respect to block 206 of FIG. 2, in accordance with various embodiments.

The lane assist system 100 may receive a lane change indicator (608). The lane change indicator may be provided by the user interface 108, e.g., a turn signal lever. In various embodiments, the driver can activate the turn signal to indicate a move to the faster lane. The lane change indicator may be provided by any device or sensor 112, e.g., a turn signal, steering wheel or camera, that may indicate that the driver intends to change, move or merge the vehicle 102 into another lane. The lane change indicator may be initiated by the driver. For example, the lane assist system 100 may receive the indication from the turn signal when the driver initiates the turn signal 126 and/or 127 using the user interface 108 (e.g., a turn signal lever) to signal to other drivers that the driver intends to move the vehicle 102 in a particular direction (e.g., to the faster lane).

The lane assist system 100 may command the automatic transmission 118 to down-shift to a gear that can meet the acceleration requirement to increase the vehicle speed to match the target speed of the moving traffic within the gap between the vehicles and/or before a rear approaching adjacent vehicle reaches the vehicle. This acceleration value can be based upon the speed of the vehicle 102, the speed of the vehicle 501, and the distance 590 (e.g., to ensure the vehicle 102 can accelerate to meet or exceed the velocity of the vehicle 501 before the vehicle 501 reaches the vehicle 102). This acceleration value can be further based on the distance between the vehicle 501 and the vehicle 503 and/or the difference in speed between the vehicle 501 and the vehicle 503 (e.g., to ensure the vehicle 102 can accelerate to meet or exceed the velocity of the vehicle 501 before the vehicle 501 reaches the vehicle 102, before a gap between the vehicles 501, 503 is too small for the vehicle 102 to safely fit therebetween, and/or to prevent the vehicle 102 from colliding with the rear of the vehicle 503). This acceleration value can be further based on the distance between the vehicle 102 and the vehicle 503 and/or the difference in speed between the vehicle 102 and the vehicle 503 (e.g., to prevent the vehicle 102 from colliding with the rear of the vehicle 503).

Figure 8:
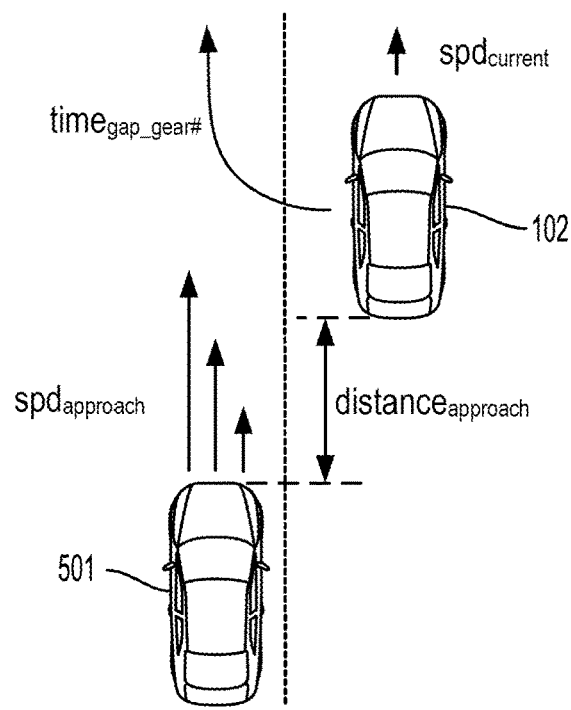
FIG. 8 shows an example illustration of a use case of when the lane assist system of FIG. 1 may be used to prepare the vehicle to move from a current lane to an adjacent lane according to an aspect of the invention.
Figure 9:
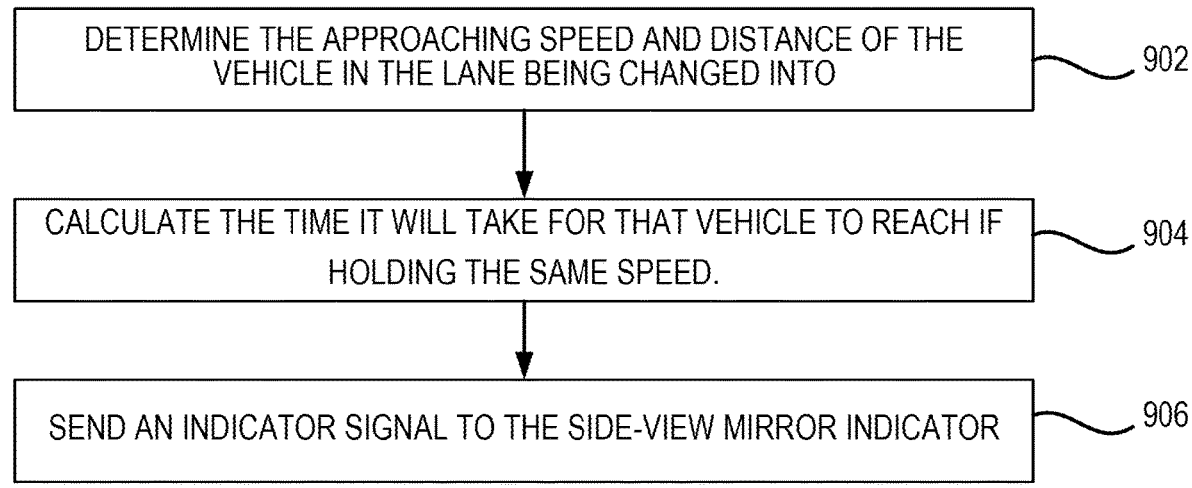
FIG. 9 is a flow diagram of an example process for controlling the lane assist system of FIG. 1 for preparing the vehicle to merge into an adjacent lane and for indicating to a driver an available time duration to make the lane change according to an aspect of the invention.

The lane assist system 100 may further determine and send a side mirror indicator signal to display an indicator on a side-view mirror (612). FIG. 8 and FIG. 9 further describe the process 900 of determining which lane change indicator to display at the side-view mirror.

The control can end once the lane change is made and the driver settles back to a cruising speed (e.g., based upon speed change and pedal steadiness). The control can end by detecting that the turn signal has been turned off (instead of or in addition to detecting the driver has settled back to the cruising speed).

Figure 7:
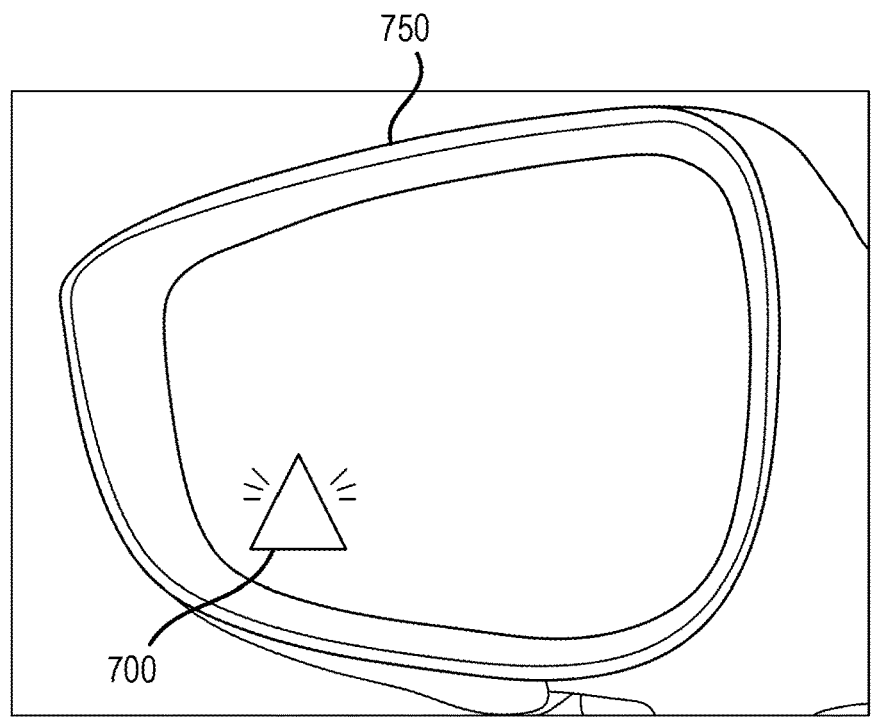
FIG. 7 shows an example illustration of an indicator being displayed on an indicator display at a side-view mirror of the vehicle according to an aspect of the invention.

FIG. 7 shows an indicator being displayed at an indicator display 700 at a side-view mirror 750. For example, the indicator display 700 can include a light source (e.g., an LED light source) that is powered on by the lane assist system 100 to display the indicator at the indicator display 700. In various embodiments, the indicator display 700 can be powered on to display different colors of light to indicate a time duration of the approaching adjacent vehicle 501 to reach the vehicle 102 (assuming no acceleration of the vehicle 102). In various embodiments, the indicator display 700 can include a blind spot monitor indicator. In this manner, aspects of the present disclosure can be integrated (e.g., retrofitted) into existing components of a vehicle, in accordance with various embodiments.

FIG. 8 shows the vehicle 102 with the lane assist system 100 traveling on a roadway, such as a highway. The lane assist system 100 can command the indicator to display at the indicator display 700 on the side-view mirror 750 (see FIG. 7) based upon a determination of the speed of the approaching adjacent vehicle 501 ($spd_{approach}$). For example, in response to the $Time_{approach}$ being determined to be greater than a first threshold value ($Th_1$) (i.e., $Th_1 < Time_{approach}$), the lane assist system 100 can command a first indicator to display at indicator display 700, for example a first color (e.g., green), a first symbol, a first brightness, a first shape, or the like, to indicate to the driver the time for the vehicle 501 to reach the vehicle 102. For example, the first indicator being displayed at indicator display 700 can indicate to the driver that a higher duration of time is available to change lanes before the adjacent vehicle 501 reaches the vehicle 102.

In response to the $Time_{approach}$ being determined to be between the first threshold value ($Th_1$) and a second threshold value ($Th_2$) (i.e., $Th_2 < Time_{approach} < Th_1$), then the lane assist system 100 can command a second indicator to display at indicator display 700, for example a second color (e.g., yellow or orange), a second symbol, a second brightness, a second shape, or the like, to indicate to the driver the time for the vehicle 501 to reach the vehicle 102. For example, the second indicator being displayed at indicator display 700 can indicate to the driver that a down-shift in gears of the automatic transmission 118 will occur or has occurred and a moderate duration of time is available to change lanes before the adjacent vehicle 501 reaches the vehicle 102. Stated differently, a moderate acceleration is needed to change lanes and accelerate to the $spd_{approach}$.

In response to the $Time_{approach}$ being determined to less than the second threshold value ($Th_2$) (i.e., $Time_{approach} < Th_2$), then the lane assist system 100 can command a third indicator to display at indicator display 700, for example a second color (e.g., red), a third symbol, a third brightness, a third shape, or the like, to indicate to the driver the time for the vehicle 501 to reach the vehicle 102. For example, the third indicator being displayed at indicator display 700 can indicate to the driver that it is unsafe to change lanes or that a significant down-shift in gears of the automatic transmission 118 (e.g., a down-shift of multiple gears) will occur or has occurred and a small duration of time is available to change lanes before the adjacent vehicle 501 reaches the vehicle 102.

Accordingly, FIG. 9 shows a flow diagram of an example process 900 for determining which lane change indicator to display on the side-view mirror. One or more computers or one or more data processing apparatuses, for example, the ECU 104 of the lane assist system 100 of FIG. 1, appropriately programmed, may implement the process 900. For ease of description, the process 900 is described below with reference to FIG. 1, FIG. 5, and FIG. 7. The process 900 of the present disclosure, however, is not limited to use of the exemplary lane assist system 100 of FIG. 1, the vehicles or roadway of FIG. 5, or the side-view mirror indicator display 700 of FIG. 7.

The lane assist system 100 may determine the approaching speed ($spd_{approach}$) and distance (see distance 590 of FIG. 5 and distance ($distance_{approach}$) of FIG. 8) of the vehicle 501 in the lane being changed into using the one or more sensors 112 (902).

The lane assist system 100 may calculate the time ($Time_{approach}$) it will take for the vehicle 501 to reach the vehicle 102 assuming the vehicle 102 maintains its current speed (904), for example using equation 4 described herein.

The lane assist system 100 may send an indicator signal to the side-view mirror indicator display 700 (see FIG. 7) (906). For example, the ECU 104 can command a current signal or a voltage signal be sent to the indicator display 700 based upon the $Time_{approach}$ as described with respect to FIG. 8. Accordingly, a color, shape, brightness, etc. of the indicator display 700 can changed based upon the indicator $Time_{approach}$. In this manner, if the approach time $Time_{approach}$ is determined to be, or changes to be, below set thresholds, the color of the indicator display 700 can be changed to alert the driver the opportunity to change lanes is closing and/or is closed. The indicator display 700 can be an LED light source configurable between different colors, intensity, shapes, etc., or may include a plurality of light bulbs, each having a different color, brightness, shape, etc.

Figure 10:
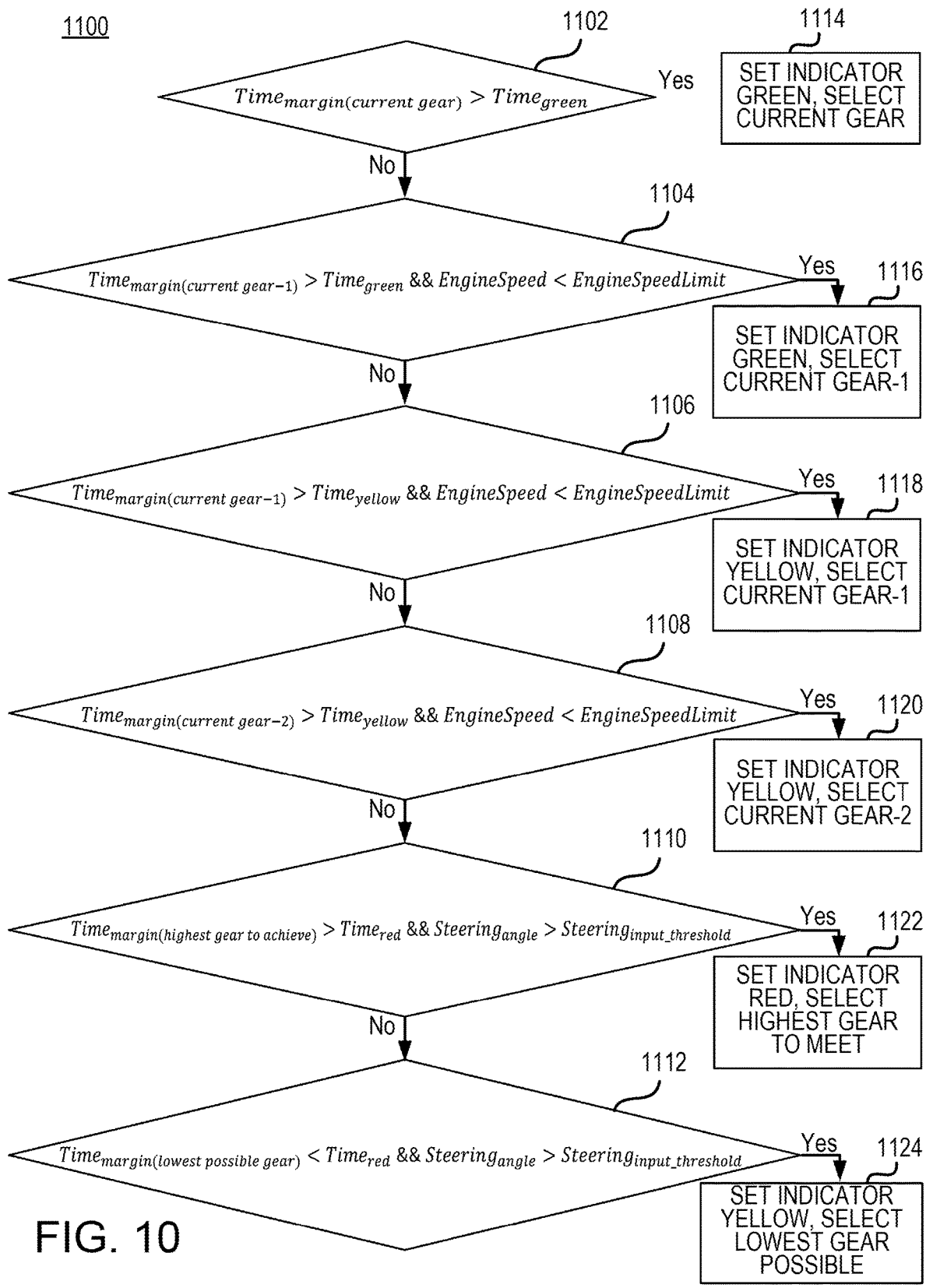
FIG. 10 is a flow diagram of an example process for controlling the lane assist system of FIG. 1 for preparing the vehicle to merge into an adjacent lane according to an aspect of the invention.

FIG. 10 shows a flow diagram of an example process 1100 for determining which lane change indicator to display on the side-view mirror. One or more computers or one or more data processing apparatuses, for example, the ECU 104 of the lane assist system 100 of FIG. 1, appropriately programmed, may implement the process 900. For ease of description, the process 900 is described below with reference to FIG. 1. The process 900 of the present disclosure, however, is not limited to use of the exemplary lane assist system 100 of FIG. 1.

The lane assist system 100 may determine whether the current gear of the automatic transmission 118 is sufficient to satisfy the time margin for a first indicator (e.g., a green light), as follows:

$$Time_{margin(current\ gear)} > Time_{green} \qquad \text{Eq. 6}$$

where the time margin for the first indicator ($Time_{green}$) is a first calibratable threshold time (1102). In various embodiments, the first calibratable threshold time corresponds to a threshold time duration for which the vehicle 102 can meet the speed of the adjacent vehicle 501 in less than the approach time ($Time_{approach}$) without having to down-shift in a safe manner. The first calibratable threshold time can be saved in a look-up table in the memory 110. If the answer at block 1102 is yes, the lane assist system 100 may command a first indicator (e.g., a green light, etc.) to display at indicator display 700 and select the current gear of the automatic transmission 118 (1114). For example, the lane assist system 100 can set the indicator green and select the current gear in preparation for the lane change. Accordingly, the lane assist system 100 can display the first indicator at the indicator display 700 when there is ample time for the vehicle 102 to make a lane change. If the answer is no, the lane assist system 100 may proceed to block 1104.

The lane assist system 100 may determine whether the gear below the current gear of the automatic transmission 118 is sufficient to satisfy the time margin for the first indicator (e.g., a green light) and whether the current engine speed is less than a calibratable engine speed limit, as follows:

$$\text{Time}_{margin(current\ gear-1)} > \text{Time}_{green}\ \&\&$$
$$\text{EngineSpeed} < \text{EngineSpeedLimit} \quad \text{Eq. 7}$$

where $\text{Time}_{margin(current\ gear-1)}$ is calculated using equation 5 for the gear below the current gear of the automatic transmission 118, EngineSpeed is the rotational speed of the engine (e.g., rotations per minute (RPMs), and EngineSpeedLimit is a calibratable rotational engine speed limit (1104). If the answer at block 1104 is yes, the lane assist system 100 may command the first indicator to display at indicator display 700 and down-shift the automatic transmission 118 to the gear below the current gear (i.e., down-shift one gear) (1116). For example, the lane assist system 100 can set the indicator green and command the automatic transmission 118 to down-shift one gear in preparation for the lane change. The calibratable rotational engine speed limit (EngineSpeedLimit) can be saved in a look-up table in the memory 110. Limiting the engine speed (e.g., the rotational speed of motor 120) at this step can prevent the motor 120 from exceeding inefficient and/or undesirable rotational speeds. If the answer is no, the lane assist system 100 may proceed to block 1106.

The lane assist system 100 may determine whether the gear below the current gear of the automatic transmission 118 is sufficient to satisfy a time margin for a second indicator (e.g., a yellow light) and whether the current engine speed is less than the calibratable engine speed limit, as follows:

$$\text{Time}_{margin(current\ gear-1)} > \text{Time}_{yellow}\ \&\&$$
$$\text{EngineSpeed} < \text{EngineSpeedLimit} \quad \text{Eq. 8}$$

where $\text{Time}_{yellow}$ is a second calibratable threshold time that is less than the first calibratable threshold time ($\text{Time}_{green}$) (1106). The second calibratable threshold time can be saved in a look-up table in memory 110. If the answer at block 1106 is yes, the lane assist system 100 may command a second indicator to display at indicator display 700 and down-shift the automatic transmission 118 to the gear below the current gear (i.e., down-shift one gear) (1118). For example, the lane assist system 100 can set the indicator yellow and command the automatic transmission 118 to down-shift one gear in preparation for the lane change. If the answer is no, the lane assist system 100 may proceed to block 1108.

The lane assist system 100 may determine whether the gear two gears below the current gear of the automatic transmission 118 is sufficient to satisfy the time margin for the second indicator and whether the current engine speed is less than the calibratable engine speed limit, as follows:

$$\text{Time}_{gap\_gear(current\ gear-2)} > \text{Time}_{yellow}\ \&\&$$
$$\text{EngineSpeed} < \text{EngineSpeedLimit} \quad \text{Eq. 9}$$

where $\text{Time}_{margin(current\ gear-2)}$ is calculated using equation 5 for the gear two gears below the current gear of automatic transmission 118 (1108). If the answer at block 1108 is yes, the lane assist system 100 may command the second indicator to display at indicator display 700 and down-shift the automatic transmission 118 to the gear two gears below the current gear (i.e., down-shift two gears) (1120). For example, the lane assist system 100 can set the indicator yellow and command the automatic transmission 118 to down-shift two gears in preparation for the lane change. If the answer is no, the lane assist system 100 may proceed to block 1110.

The lane assist system 100 may check across all available gears of the automatic transmission 118 based, at least in part, on a current speed of the vehicle 102 and determine which of the available gears is sufficient to satisfy the time margin for a third indicator and whether a current steering wheel angle is greater than a threshold angle, as follows:

$$\text{Time}_{margin(highest\ gear\ to\ achieve)} > \text{Time}_{red}\ \&\&$$
$$\text{Steering}_{angle} > \text{Steering}_{input\_threshold} \quad \text{Eq. 10}$$

where $\text{Time}_{margin(highest\ gear\ to\ achieve)}$ is calculated using equation 5 for the highest available gear below the current gear of automatic transmission 118, $\text{Time}_{red}$ is a third calibratable threshold time that is less than the second calibratable threshold time ($\text{Time}_{yellow}$), $\text{Steering}_{angle}$ is the steering angle of the steering wheel of vehicle 102, and $\text{Steering}_{input\_threshold}$ is a calibratable threshold angle with respect to a neutral angle of the steering wheel that corresponds to a straight heading (i.e., the vehicle is not turning) (1110). For example, the calibratable threshold angle can be 2 degrees, 5 degrees, 10 degrees, 15 degrees, or any other suitable threshold angle with respect to the neutral position that indicates that the driver is making, or about to make, a lane change. The calibratable threshold angle ($\text{Steering}_{input\_threshold}$) can be stored in a look-up table in memory 110. The steering angle of the steering wheel of vehicle 102 can be received from a steering wheel position sensor. Accordingly, sensors 112 can include the steering wheel position sensor. Accordingly, the vehicle 102 can include a steering wheel 129 whereby a direction of the vehicle 102 is controlled. If the answer at block 1110 is yes, the lane assist system 100 may command the third indicator to display at indicator display 700 and down-shift the automatic transmission 118 to the highest available gear that is sufficient to meet the speed of the approaching adjacent vehicle 501 before the approaching adjacent vehicle 501 reaches the vehicle 102 (i.e., down-shift to the highest suitable gear) (1122). For example, the lane assist system 100 can set the indicator red and command the automatic transmission 118 to down-shift to the high available gear in preparation for the lane change. The highest possible gear can be the highest possible gear of the automatic transmission 118 that satisfies equation 5 with a positive difference (i.e., $\text{Time}_{approach}$ is greater than $\text{Time}_{gap\_gear\#}$). If the answer is no, the lane assist system 100 may proceed to block 1112.

In response to the lane assist system 100 determining that none of the available gears are sufficient to satisfy the time margin for a third indicator and that the current steering wheel angle is greater than a threshold angle, as follows:

$$\text{Time}_{gap\_gear(lowest\ possible\ gear)} < \text{Time}_{red}\ \&\&$$
$$\text{Steering}_{angle} > \text{Steering}_{input\_threshold} \quad \text{Eq. 11}$$

where $\text{Time}_{gap\_gear(lowest\ gear\ possible)}$ is the time duration for the vehicle 102 to meet (e.g., accelerate from the current speed of the vehicle 102 to the speed of the adjacent vehicle 501) the speed of the approaching adjacent vehicle 501 for the lowest available gear (1112), then the lane assist system 100 may command the third indicator to display at indicator display 700 and down-shift the automatic transmission 118 to the lowest available gear (1124). For example, the lane assist system 100 can set the indicator red and command the automatic transmission 118 to down-shift to the lowest available gear in preparation for the lane change.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A lane assist system for a vehicle, comprising:
an automatic transmission;
a sensor for detecting an adjacent vehicle in an adjacent lane; and
an electronic control unit connected to the sensor and configured to:
determine that the vehicle intends to move from a current lane to the adjacent lane,
calculate a time duration for the adjacent vehicle in the adjacent lane to reach the vehicle, and
control operation of the automatic transmission to prepare the vehicle for a lane change based upon the determination that the vehicle intends to move from the current lane to the adjacent lane and the time duration.

2. The lane assist system of claim 1, wherein the electronic control unit is configured to determine that the vehicle intends to move from the current lane to the adjacent lane in response to detecting that a turn signal has been activated.

3. The lane assist system of claim 2, wherein the electronic control unit is further configured to determine a first time margin for a current gear of the automatic transmission based upon the time duration; and
the controlling operation of the automatic transmission includes maintaining the current gear of the automatic transmission in response to the first time margin being greater than a first threshold time.

4. The lane assist system of claim 3, wherein the electronic control unit is further configured to command a first indicator be displayed at an indicator display on a side-view mirror of the vehicle in response to the first time margin being greater than the first threshold time.

5. The lane assist system of claim 4, wherein the indicator display includes a light source.

6. The lane assist system of claim 3, wherein the electronic control unit is further configured to determine a second time margin for a gear below the current gear of the automatic transmission based upon the time duration; and
the controlling operation of the automatic transmission includes down-shifting the automatic transmission one gear in response to the second time margin being greater than a second threshold time.

7. The lane assist system of claim 6, wherein the electronic control unit is further configured to command a second indicator be displayed at the indicator display on the side-view mirror of the vehicle in response to the second time margin being greater than the second threshold time.

8. The lane assist system of claim 6, wherein the controlling operation of the automatic transmission includes down-shifting the automatic transmission one gear in response to both the second time margin being greater than the second threshold time and an engine speed of the vehicle being less than an engine speed limit.

9. The lane assist system of claim 4, wherein the electronic control unit is further configured to determine a third time margin for a gear two or more gears below the current gear of the automatic transmission based upon the time duration;
the controlling operation of the automatic transmission includes down-shifting the automatic transmission in response to the third time margin being greater than a third threshold time; and
the electronic control unit is further configured to command a third indicator be displayed at the indicator display on the side-view mirror of the vehicle in response to the third time margin being greater than the third threshold time.

10. The lane assist system of claim 9, wherein the controlling operation of the automatic transmission includes down-shifting the automatic transmission in response to both the third time margin being greater than the third threshold time and a steering angle of a steering wheel of the vehicle being greater than a threshold angle.

11. The lane assist system of claim 1, further comprising:
a battery for storing electrical energy;
a battery management unit for managing charging and discharging of the electrical energy of the battery to power movement of the vehicle; and
a motor that uses the electrical energy to power movement of the vehicle.

12. The lane assist system of claim 1, wherein to calculate the time duration for the adjacent vehicle in the adjacent lane to reach the vehicle the electronic control unit is configured to:
calculate a distance between the vehicle and the adjacent vehicle in the adjacent lane;
calculate a speed difference between a speed of the adjacent vehicle and a speed of the vehicle; and
calculate a quotient of the distance between the vehicle and the adjacent vehicle divided by the speed difference between the speed of the adjacent vehicle and the speed of the vehicle, said quotient being the time duration.

13. The lane assist system of claim 1, further comprising:
a user interface element for receiving driver input that indicates that a driver intends to merge the vehicle into the adjacent lane; and
wherein the electronic control unit is configured to obtain, from the user interface element, the driver input that indicates that the driver intends to merge into the adjacent lane.

14. A method for controlling operation of a vehicle to assist in lane changing, comprising:
obtaining, from at least one of a sensor or an external database, a position of an adjacent vehicle in an adjacent lane;
calculating, by an electronic control unit, a time duration for the adjacent vehicle to reach a position of the vehicle;
determining, by the electronic control unit, that the vehicle intends to move from a current lane to the adjacent lane; and
controlling, by the electronic control unit, an operation of an automatic transmission of the vehicle to prepare for a lane change of the vehicle based on the time duration and the determination that the vehicle intends to move from the current lane to the adjacent lane.

15. The method of claim 14, wherein calculating the time duration for the adjacent vehicle to reach the position of the vehicle includes:
calculating a distance between the vehicle and the adjacent vehicle in the adjacent lane;

calculating a speed difference between a speed of the adjacent vehicle and a speed of the vehicle; and calculating a quotient of the distance between the vehicle and the adjacent vehicle divided by the speed difference between the speed of the adjacent vehicle and the speed of the vehicle, said quotient being the time duration.

16. The method of claim 15, wherein controlling the operation of the automatic transmission of the vehicle to prepare for the lane change includes at least one of maintaining a current gear of the automatic transmission or down-shifting the automatic transmission.

17. The method of claim 15, further comprising sending, by the electronic control unit, an indicator to be displayed at an indicator display on a side-view mirror of the vehicle based upon the time duration.

* * * * *